Dec. 10, 1929.  C. M. SWINGLE  1,738,852
SUSPENSION FOR VEHICLES
Filed April 5, 1927  2 Sheets-Sheet 1
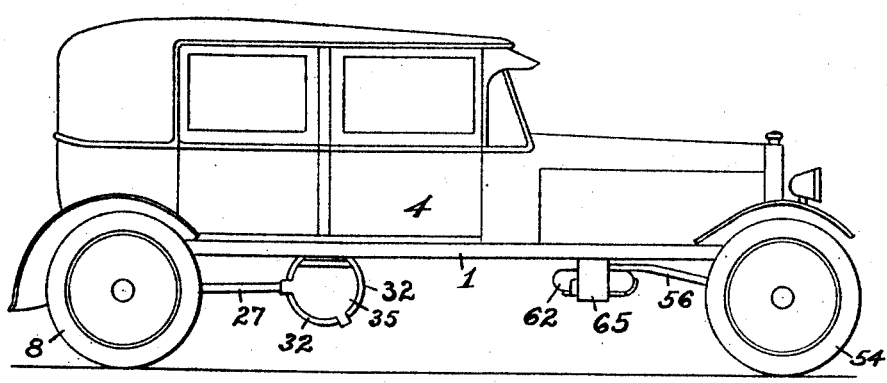
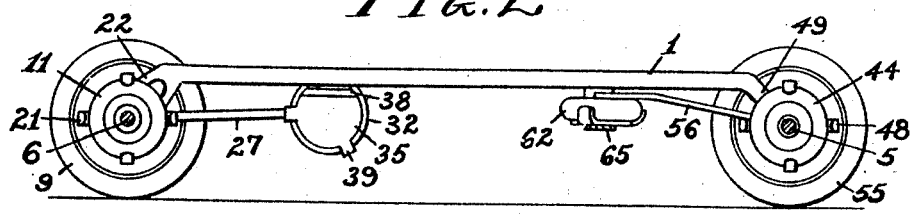
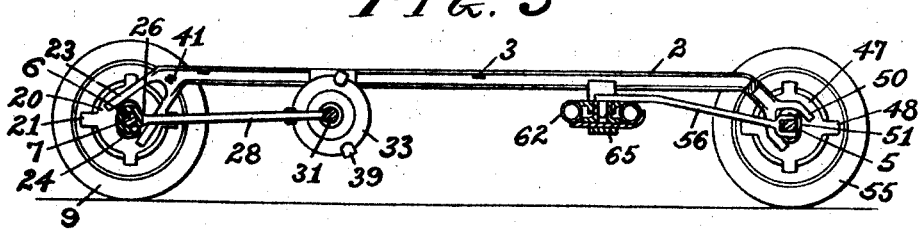
Inventor
C. M. Swingle
By G. E. Dunstan
his Attorney Dec. 10, 1929.  C. M. SWINGLE  1,738,852
SUSPENSION FOR VEHICLES
Filed April 5, 1927   2 Sheets-Sheet 2
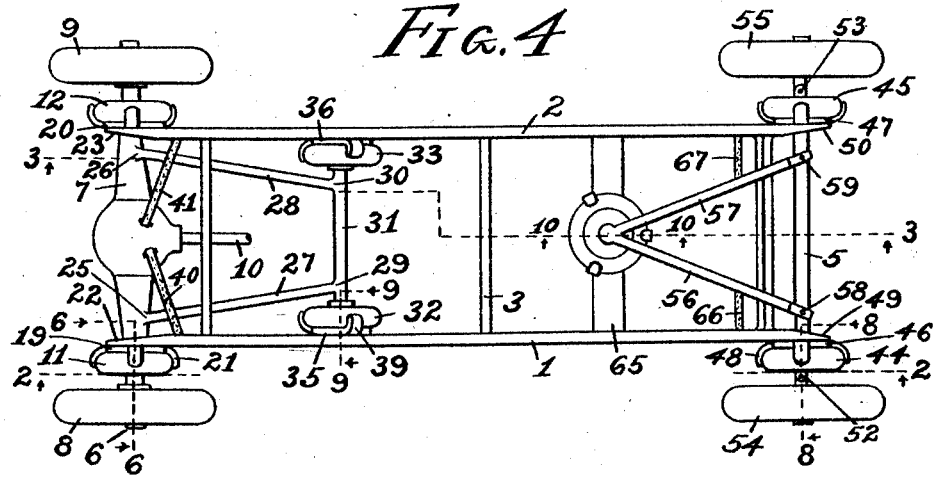
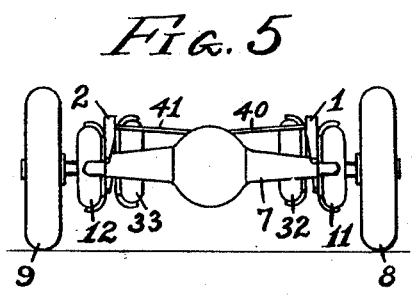
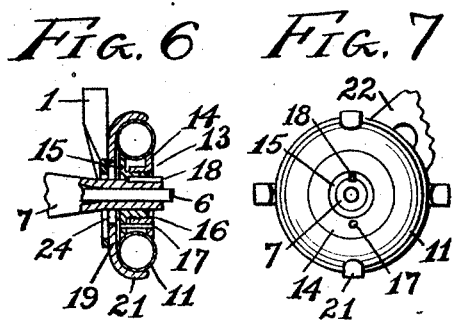
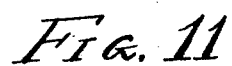
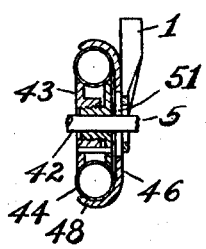
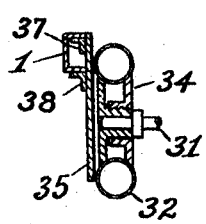
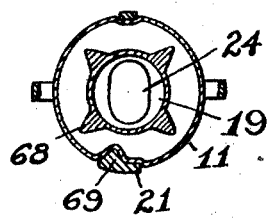
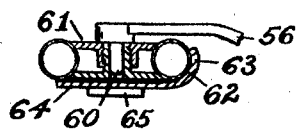
Inventor
C. M. Swingle
By G. E. Dunstan,
his Attorney Patented Dec. 10, 1929

1,738,852

UNITED STATES PATENT OFFICE

CHARLES M. SWINGLE, OF CLEVELAND, OHIO, ASSIGNOR TO EVA-MAE SWINGLE AND MILDRED E. SWINGLE

SUSPENSION FOR VEHICLES

Application filed April 5, 1927. Serial No. 181,106.

This invention relates to suspensions for vehicles and has for its principal object to provide a suspension for vehicles which will resiliently support the body of a vehicle by the use of compressed air instead of the usual leaf springs. Another object of the invention is to provide a device of the above character, which will prevent the body of the vehicle returning suddenly after being thrown upwardly due to the vehicle traveling over rough roads and thereby prevent shocks in addition to resiliently supporting the body of the vehicle. A further object of the invention is to provide a device of the above character, which is of practical construction and although designed especially for automobiles is adapted for all types of vehicles.

With the above and other objects in view, the invention will be hereinafter fully described as illustrated in the accompanying drawings, and the novel features thereof will be distinctly pointed out in the appended claims.

In the drawings similar characters of reference are used to designate corresponding parts.

Figure 1 illustrates an automobile body supported by a suspension constructed in accordance with my invention, Fig. 2 is a sectional view taken on line 2—2 of Fig. 4, Fig. 3 is a sectional view taken on line 3—3 of Fig. 4, Fig. 4 is a plan view of Fig. 2, Fig. 5 is a rear view of Fig. 4, Fig. 6 is a cross-sectional view, on an enlarged scale, taken on line 6—6 of Fig. 4, Fig. 7 is a side elevation of Fig. 6, Fig. 8 is a cross-sectional view, on an enlarged scale, taken on line 8—8 of Fig. 4, Fig. 9 is a cross-sectional view, on an enlarged scale, taken on line 9—9 of Fig. 4, Fig. 10 is a longitudinal sectional view, on an enlarged scale, taken on line 10—10 of Fig. 4, and Fig. 11 is a longitudinal sectional view illustrating the inflated tubular members carried by the frame.

Referring to the drawings, 1 and 2 represent side beams, which are connected at suitable intervals by cross-bars, indicated by 3, to form the frame of the chassis of an automobile. The body of the automobile 4 is bolted or fixed to said frame, and the inflated members for resiliently supporting the same upon the forward and rear axles, indicated by 5 and 6 respectively, will now be described. The rear axle 6 is rotatably mounted and enclosed in a suitable housing 7, and fixed to its extending ends are the wheels 8 and 9. Said rear axle is driven by the transmission shaft 10 in the ordinary manner. Mounted upon the ends of the housing 7 are members 11 and 12 consisting of tubular rings of rubber similar to the inner tubes of tires, which are adapted to be inflated in any suitable manner. Each of the tubular rubber members 11 and 12 is supported upon and clamped to a sleeve or bushing 13 formed of two flanged parts 14 and 15, which are connected together by means of threads at 16. Any suitable means, as for instance, a pin as at 17 may be employed for preventing the parts 14 and 15 of the sleeves or bushings becoming unscrewed and loose. The sleeves or bushings 13 are fixed to the ends of the housing 7 by a key, as indicated at 18, or by any other suitable means. For supporting the rear ends of the side beams 1 and 2 upon the tubular rubber members 11 and 12, circular plates 19 and 20, which have formed integrally therewith a plurality of graspers, indicated by 21, are fixed to the forked ends 22 and 23 of said side beams. The upper and lower graspers engage the tubular rubber members 11 and 12, while the forward and rear graspers are in spaced relation thereto to permit longitudinal movement thereof. The circular plates 19 and 20 are provided with sufficiently large central openings, indicated by 24, to permit free movement of said plates and the ends of the housing relative to each other. The openings 24 of the circular plates 19 and 20 are elongated vertically and the side edges thereof limit longitudinal movement.

Extending forwardly from and connected rigidly to the housing 7 at 25 and 26 to prevent torque are arms 27 and 28, which are rigidly connected at 29 and 30 to a cross-bar or axle 31. The ends of the cross-bar or axle 31 are resiliently connected to the side beams 1 and 2 by means of inflated rubber members 32 and 33 which are similar to the previously described members 11 and 12. Sleeves or bushings, as indicated at 34, similar to the sleeves or bushings 13, are loosely mounted upon the ends of the cross-bar or axle 31, and the members 32 and 33 are mounted upon the same and clamped between the flanges thereof. Circular plates 35 and 36 are fixed to the side beams 1 and 2 by means of angle pieces 37 and 38 or other suitable means, and graspers, indicated by 39, formed integrally with said plates, partially encircle and engage the members 32 and 33. Suitable straps 40 and 41, which are connected to the housing 7 and to the side beams 1 and 2 limit relative movement of said parts.

The forward axle 5 extends beyond the side beams 1 and 2, is cylindrical as indicated at 42 for receiving sleeves or bushings 43, which are similar to the sleeves or bushings 13, and hold inflated rubber members 44 and 45 similar to the members 11 and 12. Circular plates 46 and 47 having graspers, indicated by 48, are fixed to the forward forked ends 49 and 50 of the side beams 1 and 2, and the central vertical elongated openings, indicated by 51, of said plates, permit movement thereof relative to the axle 5 but limit the relative longitudinal movement thereof. The upper and lower graspers 48 engage the inflated rubber members 44 and 45 and the forward and rear graspers are in spaced relation thereto as previously described. Pivoted to the end of the forward axle 5 at 52 and 53 are the usual knuckles carrying the spindles, upon which are rotatably mounted the wheels 54 and 55.

For bracing the forward axle 5 radius rods 56 and 57 are pivotally connected thereto at 58 and 59, and extend to a central depending pin 60. This pin rests in a sleeve or bushing 61, similar to the sleeve or bushing 13, which securely holds an inflated tubular rubber member 62 similar to the member 32 but arranged horizontally instead of vertically. The inflated tubular rubber member 62 is held by the graspers 63 of a circular plate 64, which is fixed to a cross bracket 65 carried by the side beams 1 and 2 of the frame. Suitable straps 66 and 67 connect the radius rods 56 and 57 to the side beams 1 and 2 for preventing excessive movement of the frame relative to the front axle.

The tubular rubber members 11—12 and 44—45 are provided with a suitable number of triangular partitions 68 for restricting the openings thereof to retard the passage of air caused by compression due to the vehicle traveling over rough roads and thereby reduce or eliminate shocks. For the same purpose, the circular plates 19—20 and 46—47 and the lower graspers thereof carry triangular blocks 69 for depressing the tubular members.

From the drawings and description, it is seen that the body of a vehicle is resiliently supported upon inflated rubber members in a simple and practical manner, and that while there is sufficient allowance for relative movement, the same is limited within proper confines for comfort and safety and that not only is the body of the vehicle resiliently supported but shocks thereto caused by the vehicle traveling over rough roads is reduced to a minimum or eliminated. Although the suspension as illustrated and described is well adapted for carrying out the intended purpose, it is to be understood that slight changes in the details of construction may be made within the scope of the claims.

Having fully described my invention what I claim is:

1. In a suspension for vehicles, the combination of a frame, wheels, inflated members, the inflated members being supported by the wheels, plates, graspers formed integrally with the upper and lower and the forward and rear edges of the plates, the upper and lower graspers engaging the inflated members, and the forward and rear graspers being in spaced relation to the inflated members.

2. In a suspension for vehicles, the combination of a frame, means for supporting the forward end of the frame, an axle, wheels fixed to the axle, a housing for the axle, plates fixed to the rear end of the frame, inflated members, graspers formed integrally with the plates and engaging said inflated members, and said plates being provided with vertical elongated openings for receiving said housing and of sufficient size to permit movement between said plate and said housing but limit the relative longitudinal movement thereof.

3. In a suspension for vehicles, the combination of a frame, means for supporting the forward end of the frame, an axle, wheels fixed to the axle, a housing for the axle, inflated members, means connecting the frame to said inflated members, a cross-bar, arms fixed to the housing and carrying the cross-bar, inflated members supported by the cross-bar, and means supported by the frame and engaging the inflated members.

4. In a suspension for vehicles, the combination of a frame, means for supporting the forward end of the frame, an axle, wheels fixed to the axle, a housing for the axle, inflated members, means connecting the frame to said inflated members, a cross-bar, arms fixed to the housing and carrying the cross-bar, inflated members loosely mounted upon the cross-bar, and means connecting the frame to the said second mentioned inflated members.

5. In a suspension for vehicles, the combination of a frame, means for supporting the rear end of the frame, an axle, wheels rotatably mounted upon the axle, inflated members, the frame being supported from the inflated members, an inflated member supported by the frame, radius rods extending from the axle, and the radius rods being supported by the last mentioned inflated member.

6. In a suspension for vehicles, the combination of a frame, axles, inflated tubular members, sleeves for holding the inflated tubular members, the sleeves consisting of two parts held together by threads, means for preventing rotation of said parts of said sleeves relative to each other, said sleeves being supported by said axles, and said frame being supported by said inflated tubular members.

7. In a vehicle suspension, as a substitute for the usual spring, a combination of elements consisting of a metal carrier which supports a resilient member and means for holding the vehicle body in proper relationship to said resilient member and to the running-gear upon which said metal carrier is mounted; and means for counteracting torque.

8. In a vehicle suspension, as a substitute for the usual spring, a combination of elements consisting of a metal carrier which supports a resilient member, means for holding a vehicle body in proper relationship to said resilient member and to the running gear upon which said metal carrier is mounted, means for counteracting torque, and graspers or contacts with blocks thereon in relation to said resilient member, the graspers or contacts being continuous in structure with the foundation beams of the vehicle body.

9. In a vehicle suspension, as a substitute for the usual spring, a combination of elements consisting of a metal carrier which supports a resilient member, means for holding a vehicle body in proper relationship to said resilient member and to the running gear upon which said metal carrier is mounted, means for counteracting torque, graspers or contacts with blocks thereon in relation to said resilient member, the graspers or contacts being continuous in structure with the foundation beams of the vehicle body, and means both internal and external to the resilient member, for retarding the movement of the vehicle body relative to the running gear.

10. In a vehicle suspension, as a substitute for the usual spring, a combination of elements consisting of a metal carrier which supports a resilient member, means for holding a vehicle body in proper relationship to said resilient member and to the running gear upon which said metal carrier is mounted, means for counteracting torque, and means for limiting the longitudinal movement of the vehicle body, said means being continuous in structure with the foundation beams of the vehicle body.

11. In a vehicle suspension, as a substitute for the usual spring, a combination of elements consisting of a metal carrier which supports a resilient member, and means for holding the vehicle body in proper relationship to said resilient member and to the running gear upon which said metal carrier is mounted, means for counteracting torque, and radius rods horizontally connected to the vehicle body.

12. In a vehicle suspension, as a substitute for the usual spring, a combination of elements consisting of a metal carrier which supports a resilient member, means for holding a vehicle body in proper relationship to said resilient member and to the running gear upon which said metal carrier is mounted, means for counteracting torque, and means for fixing the carrier rigidly upon the running gear.

13. In a suspension for vehicles, the combination of a frame, wheels, inflated members, the inflated members being supported by the wheels, plates, graspers fixedly connected to the upper and lower and forward and rear edges of the plates, the upper and lower graspers engaging the inflated members, and the forward and rear graspers being in spaced relation to the inflated members.

In testimony whereof I affix my signature.

CHARLES M. SWINGLE.